UNITED STATES PATENT OFFICE.

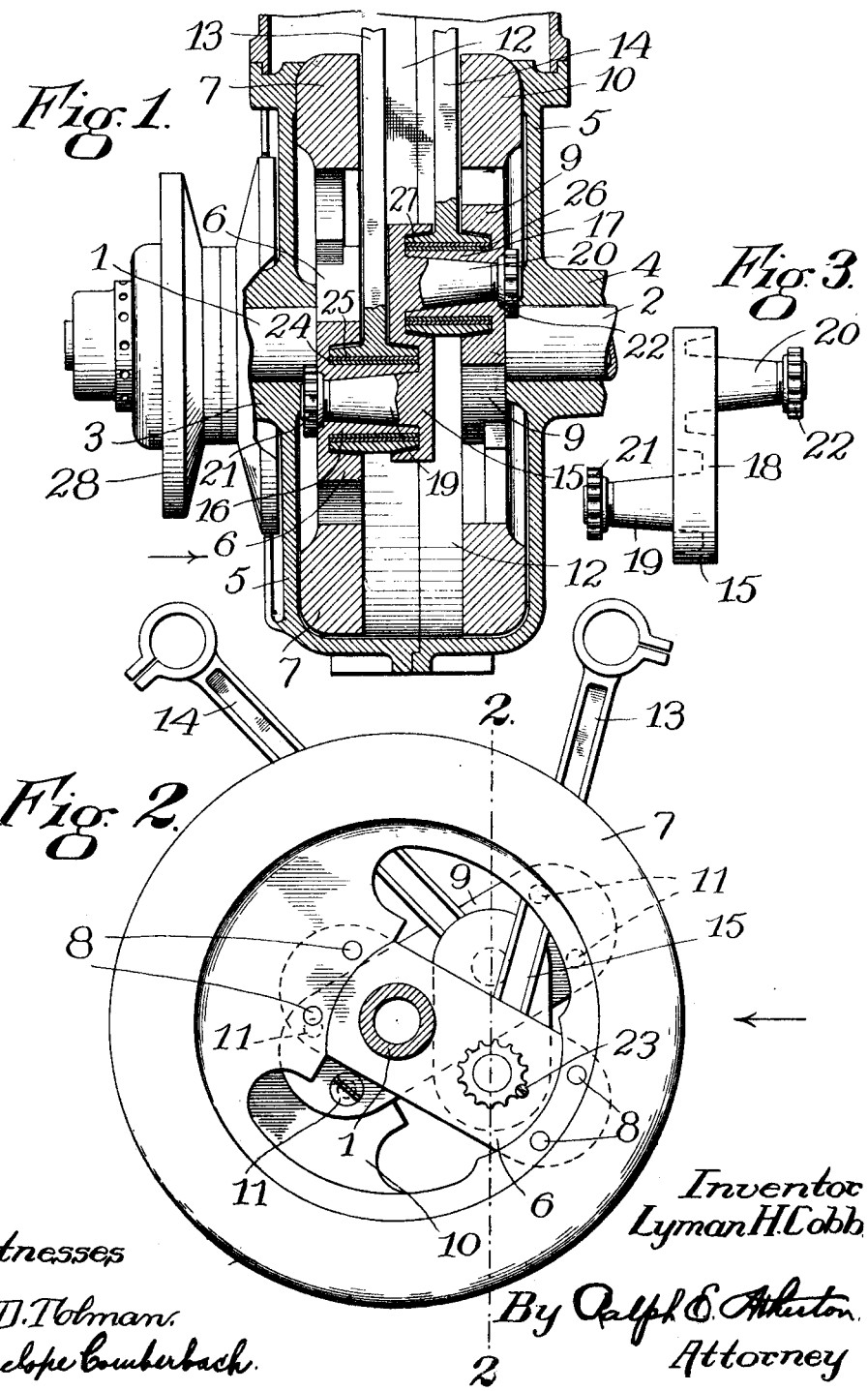

LYMAN H. COBB, OF FITCHBURG, MASSACHUSETTS, ASSIGNOR TO MARY ELIZABETH JOHNSON, TRUSTEE, OF FITCHBURG, MASSACHUSETTS.

CRANK-SHAFT MECHANISM FOR INTERNAL-COMBUSTION ENGINES.

1,186,749.

Specification of Letters Patent. Patented June 13, 1916.

Application filed January 28, 1913. Serial No. 744,642.

*To all whom it may concern:*

Be it known that I, LYMAN H. COBB, a citizen of the United States, residing at Fitchburg, in the county of Worcester and Commonwealth of Massachusetts, have invented a new and useful Improvement in Crank-Shaft Mechanism for Internal-Combustion Engines, of which the following, together with the accompanying drawing, is a specification.

My invention relates to internal combustion engines and more particularly to that portion of such engines including the crank shaft and connecting rods and the mechanism connecting them. The invention is, furthermore, particularly adapted to such engines having more than one cylinder.

The objects of the invention are to provide an improved construction which shall be very simple and compact and the parts of which shall be so related and connected as to secure great rigidity and consequent smoothness in operation. These objects, as well as others, are accomplished by the construction and arrangement of parts as hereinafter described, the novel features being pointed out in the appended claim.

The type of internal combustion engine to which my invention more particularly relates is that adapted to be used in motorcycles in which the available space for the engine is extremely limited, and the use of the engine unusually severe owing to the jar and vibration incident to its operation, especially in passing over rough places.

The principles of the invention will be explained in connection with one embodiment thereof as shown in the accompanying drawing, in which—

Figure 1 is a sectional view on the line 2—2 of Fig. 2; Fig. 2 is a side view of the moving parts within the crank case; and Fig. 3 is a view of a novel form of connector by means of which the two crank pins and cranks shown in Figs. 1 and 2 are maintained at a constant angular displacement.

Like parts are indicated in the drawing by similar reference characters.

In the form of the invention shown in the drawing, the crank shaft comprises two alined parts 1 and 2 journaled in bearings 3 and 4 formed in the opposite sides of a crank case 5. Carried rigidly on the inner end of the part 1 of the crank shaft is a crank 6 in the form of a plate, the part 1 meeting the crank or plate 6 at a point between the two ends thereof, as shown clearly in Fig. 2. An annular block 7, serving as a fly-wheel, is attached by screws 8, or otherwise, to the opposite ends of the crank 6 and in a position concentric with the crank shaft. The part 2 of the crank also carries at its inner end a plate or crank 9 similar to the crank 6 carried by the part 1 of the shaft. A second annular block 10, serving as a fly-wheel, is attached to the opposite ends of the crank 9 by screws 11, or otherwise, this fly-wheel being concentric with the part 2 of the crank shaft. The fly-wheel 7 and crank 6 are separated sufficiently from the fly-wheel 10 and crank 9 to provide a suitable space 12 between them for the connecting rods 13 and 14 and the connector 15.

Projecting from the inner face of the crank 6 is a cylindrical sleeve 16, the opening through the sleeve being extended to the outer or opposite face of the crank 6 and being tapered or conical with its larger end away from the crank. A similar cylindrical sleeve 17 projects from the inner face of the crank 9, there being a conical opening through this sleeve and crank similar to the opening in the sleeve 16 and crank 6.

The connector 15 comprises a body portion 18 in the form of a flat plate and two pins or studs 19 and 20 projecting from the opposite faces and from points near the opposite ends of the body portion 18 of the connector. The studs 19 and 20 are tapered to fit accurately within the conical openings through the sleeves 16 and 17 respectively, and the outer ends of the studs are threaded to receive suitable nuts 21 and 22 to draw the studs into their respective sleeves and to retain them firmly in place. The nuts 21 and 22 are locked to prevent their becoming loose by small locking screws 23 which engage suitable notches in the peripheries of the nuts. The distance between the axes of the studs 19 and 20 is such that the cranks 6 and 9 are maintained by the connector 15 at the proper angular displacement. In the arrangement shown in the drawing, the connector is designed to maintain the cranks at an angular displacement of 60° so as to coöperate properly with two engine cylinders set 60° apart about the crank shaft.

The sleeve 16 and stud 19 form a crank pin upon which the crank end of the connecting rod 13 is pivoted, the sleeve 16 being provided with a suitable antifriction sleeve 24 and the connecting rod 13 being provided with an antifriction sleeve 25 fitting over the sleeve 24. In like manner the sleeve 17 and stud 20 form a crank pin upon which the crank end of the connecting rod 14 is pivoted, suitable antifriction sleeves 26 and 27 being provided between the sleeve 17 and connecting rod 14. Annular depressions are formed in the faces of the cranks 6 and 9 about the bases of the sleeves 16 and 17, and similar annular depressions are also formed in the faces of the body portion 18 of the connector 15 about the bases of the studs 19 and 20. These annular depressions provide widened spaces along the outer faces of the sleeves 16 and 17 into which the journals at the crank ends of the connecting rods 13 and 14 are extended in order to provide sufficiently large bearing surfaces.

The part 1 of the crank shaft carries a grooved driving pulley 28 to accommodate the usual driving belt of the motorcycle. The part 2 of the crank shaft is connected in any suitable manner with the engine valves so as to operate them in properly timed relation with the movements of the pistons within the cylinders.

While I have illustrated the principles of my invention by showing and describing the details of one form thereof, I do not wish to be limited to such details as it is obvious that certain changes may be made within the scope of the appended claim without departing from the spirit of the invention; but

What I claim as new and desire to secure by Letters Patent is:

In an internal combustion engine, a crank shaft comprising alined separated members having opposing spaced crank plates secured eccentrically thereto and angularly displaced, one from the other, a connecting member disposed between said plates in a plane parallel to the planes of said plates, an annular weighted member, eccentric to said plates, and concentric with said shaft, connected to the ends of each plate, said connecting member having oppositely extending pins thereon, each connected to one of said crank plates, and connecting rods with their crank ends pivoted upon said pins, the opposed faces of said crank plates and said connecting member being recessed in surrounding relation to said pins, and the crank ends of the connecting rods being extended into the recesses so formed.

Dated this 24th day of January, 1913.

LYMAN H. COBB.

Witnesses:
NELLIE WHALEN,
PENELOPE COMBERBACH.